United States Patent [19]
Herold et al.

[11] Patent Number: 5,227,637
[45] Date of Patent: Jul. 13, 1993

[54] APPARATUS FOR IRRADIATING FLUIDS

[75] Inventors: Wolf D. Herold, Seefeld; Olaf Bielmeier, Munich; Peter Koran, Weilheim, all of Fed. Rep. of Germany

[73] Assignee: Thera Patent GmbH & CO. KG, Seefeld, Fed. Rep. of Germany

[21] Appl. No.: 863,225

[22] Filed: Apr. 3, 1992

[30] Foreign Application Priority Data

Apr. 10, 1991 [DE] Fed. Rep. of Germany ....... 9104387
Jan. 27, 1992 [EP] European Pat. Off. ........... 92101251

[51] Int. Cl.$^5$ .................. B29C 35/08; B01J 19/08
[52] U.S. Cl. .................... 250/438; 250/437; 250/492.1
[58] Field of Search ............ 250/438, 437, 435, 432, 250/428, 492.1

[56] References Cited
U.S. PATENT DOCUMENTS 3,527,940 9/1970 Balanca ................. 250/437

FOREIGN PATENT DOCUMENTS 3702999 8/1988 Fed. Rep. of Germany .
1278161 10/1960 France ................. 250/432
90710 2/1968 France .
2500948 9/1982 France .
639467 6/1950 United Kingdom .

Primary Examiner—Jack I. Berman
Attorney, Agent, or Firm—Foley & Lardner

[57] ABSTRACT

An apparatus for irradiating fluids includes a conduit (11) through which the fluid flows, in which a static mixer (21) is disposed and which passes through a cooling vessel (16) having an annular cross-section. This arrangement is surrounded by several U-shaped fluorescent tubes (19, 20), whose legs, extending parallel to the conduit, are distributed around the periphery of the conduit (11). The mixer (21) effects a highly turbulent flow, such that all parts of the fluid are uniformly irradiated with radiation. If the fluid is a glue which is to be preactivated by the radiation, then the turbulent flow and the reaction rate, which is reduced by the cooling, retard the setting of polymerized fluid components on the inner wall of the reaction conduit, and thereby also inhibit the gradual blockage of the conduit (11).

11 Claims, 2 Drawing Sheets

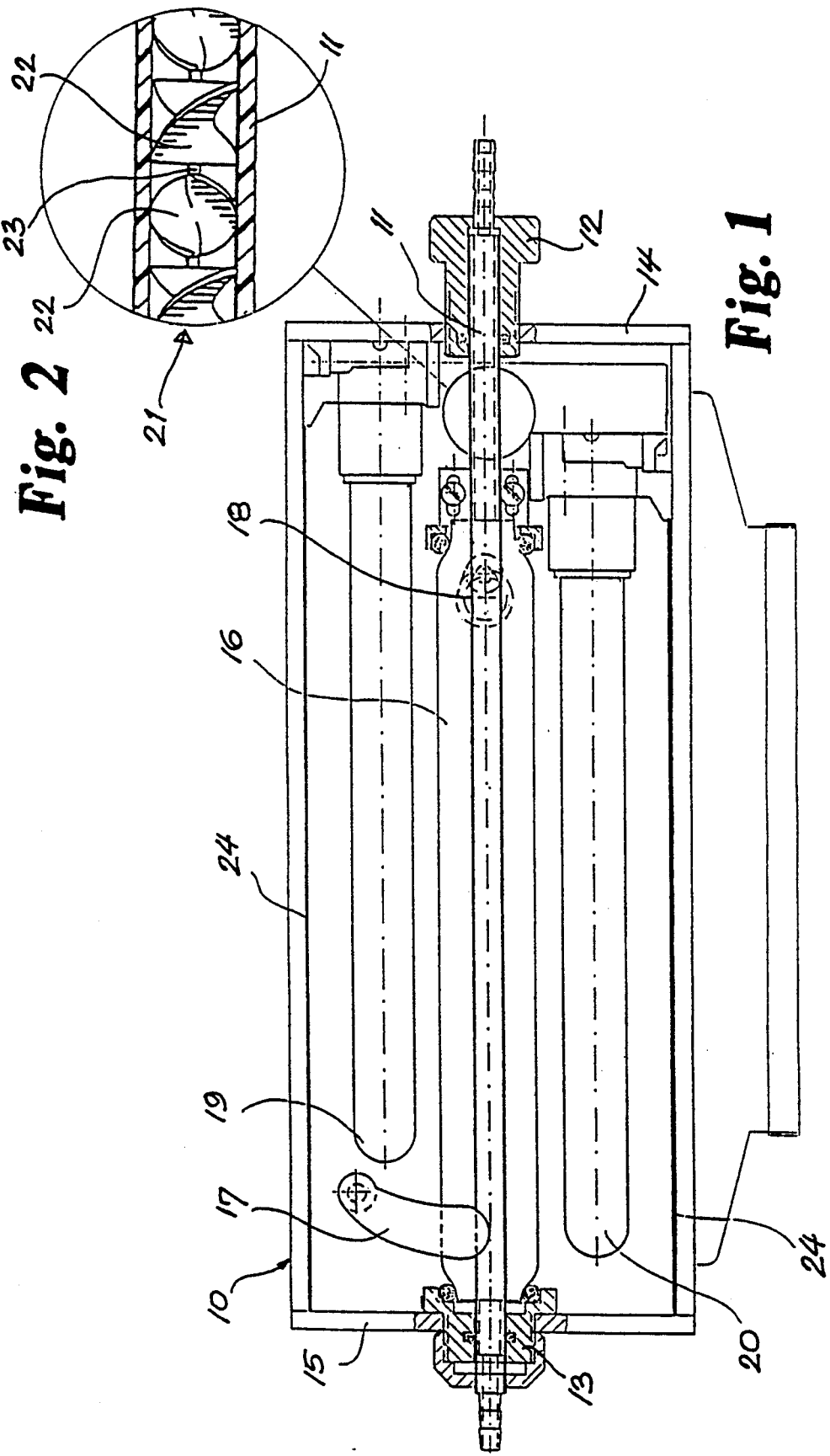

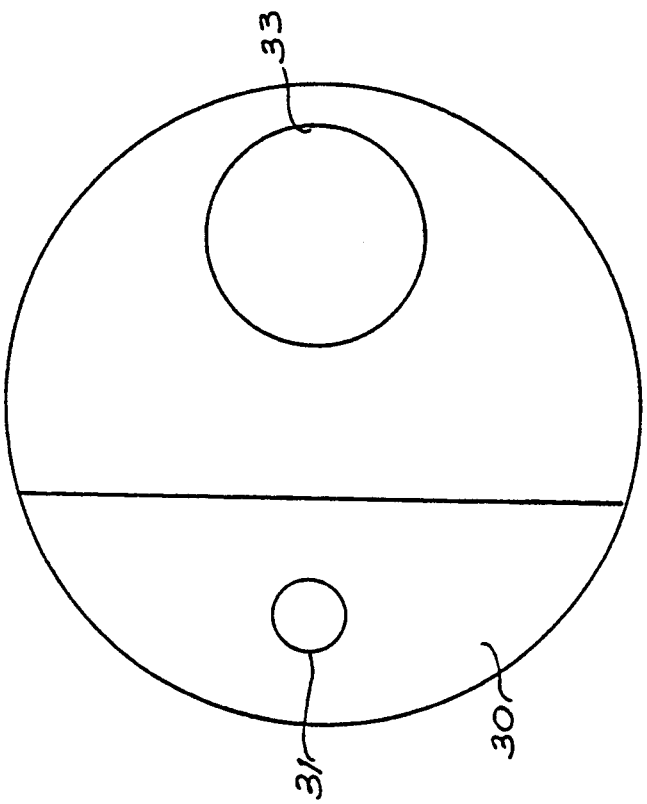
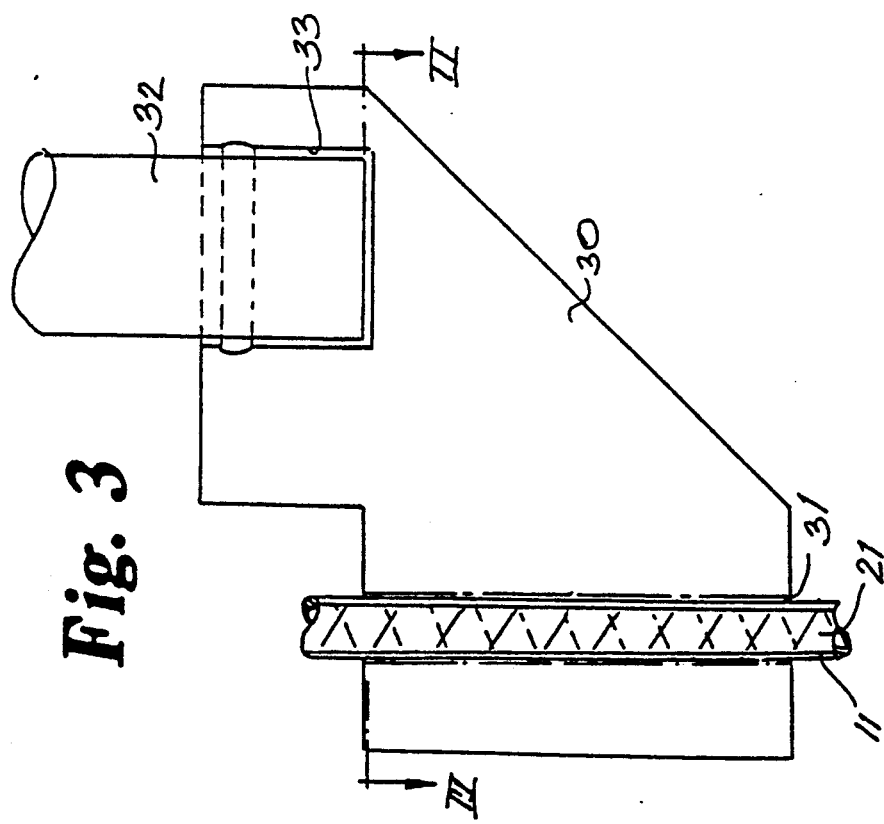

APPARATUS FOR IRRADIATING FLUIDS

BACKGROUND OF INVENTION

In DE-A 3 702 999, an apparatus for irradiating fluids is disclosed which includes a transparent conduit through which fluid flows and which is irradiated by a radiation source. In this case, the fluid is a UV-hardening reaction resin, which flows through a tube which is irradiated by a UV radiation source, and is then applied to the treatment area, where the resin is activated by the irradiation and subsequently polymerizes.

The intensity of the radiation and thus the rate of activation decreases exponentionally with the thickness of the irradiated fluid layer. The known device therefore works with a relatively thin tube, and a reflector is positioned on the side of the tube opposite the radiation source, such that the fluid flowing through the tube is irradiated from two opposite sides. In one variation the radiation is conveyed through a cylindrical rod, and the fluid to be irradiated flows coaxially along the rod. In a further variation the known device is configured such that a thin flow layer is formed along a flat or slightly curved, irradiated surface.

The problem of irradiating thin flowing layers uniformly with electromagnetic radiation also occurs in the sterilization of fluids. FR-A-25 00 948 discloses a device for this purpose, in which centrifugal forces cause a thin layer of the fluid to climb up the inner wall of the rotating tapered vessel, where it is irradiated by fluorescent tubes projecting into the vessel.

The known devices present the difficulty that, in order to achieve homogeneous irradiation of the entire fluid, a layer must be formed which is as thin as possible; furthermore, because the flow rate is limited by the amount of energy per unit volume required for activation, polymerization or sterilization as the case may be, the surface of the thin fluid must be made correspondingly large to achieve a volume flow rate usable for practical purposes; but the larger the surface area, the more difficult it is to irradiate it homogeneously with available light sources.

The preactivation of polymerizable fluids, such as adhesives, presents the further difficulty that polymerization begins after activation. As a result, an ever thicker layer of fluid grows on the wall of the vessel through which the fluid flows, on which the flow rate is zero, which not only increasingly diminishes the cross-section of the flow, but also absorbs an ever-increasing percentage of the radiation.

The patent of addition FR-90710 discloses a device in which a fluid of addition is conveyed through tubes, which are positioned opposite a flat ionizating radiation source. Rigid rods are located in the tubes and carry spiral ridges on their outer surfaces, in order to ensure that those parts of the product which enter the tube on the side turned away from the radiation source are also exposed to radiation.

GB-A-639 467 discloses yet another arrangement, in which the product flows through a tube furnished with a spiral groove on its inner wall. Again, the groove ensures that all parts of the product are brought at least once to a position facing a radiation lamp lying parallel to the tube.

SUMMARY OF THE INVENTION

It is an object of the invention to provide an apparatus for irradiating fluids which guarantees a highly uniform irradiation of the entire fluid, with the greatest possible flow rate. When used for the preactivation of polymerizable fluids, the device according to the invention furthermore prevents blockage as long as possible.

The solution to this problem according to the invention includes a mixing means having vanes for deflecting the fluid flow transversely with respect to the axis of the conduit through which the fluid flows.

Accordingly, a mixing means is carried in the conduit and has vanes which inhibit laminar flow of the fluid, such that all layers of the flowing fluid reach the outer wall of the conduit. This mixing produces a motion within the flow, as a result of which all parts of the volume of fluid reach the tube wall again and again, so that a homogeneous irradiation of the entire fluid flowing through the conduit is guaranteed. At the same time, flow vectors are created perpendicular to the conduit axis, thereby producing turbulence at the conduit wall and preventing occlusion. Therefore, the device according to the invention is suitable not only for the sterilization of water or other fluids, but also for the preactivation of radiation-polymerizable synthetic resins.

In this so-called preactivation a special synthetic resin formulation is used, which does not immediately begin to polymerize when irradiated with light, but which begins to harden only after a certain latency period. For this purpose, epoxides, mostly cyclo-aliphatic, are used together with photoinitiators based on ferrocene salts.

Another embodiment of the invention includes a static mixer having a plurality of screw-shaped vanes positioned behind one another in the axial direction, each of which divides the oncoming fluid stream and diverts it outwardly from the axis. This presents the advantage that a commercially available static mixer can be used, which is available in adequate lengths and in combination with a correspondingly long conduit produces an extraordinarily thorough mixing of the fluid. A greater conduit length is further advisable, in order to ensure adequate irradiation without the use of special-purpose lamps. With a long conduit, the irradiation dose required for a given fluid may be controlled by shielding a part of the conduit length. The static mixer further presents an inexpensive component, which can be thrown away after extended use of the apparatus or after an extended period of non-use, together with the conduit (which may be made from acrylic). This use of a static mixer presents a further advantage in the design of the apparatus, since it does not require any drive mechanism, because the mixing action is generated by the flow of the fluid itself.

In one embodiment fluorescent tubes which are positioned parallel to the conduit, which may be commercially available lamps. This permits a uniform and intensive irradiation at several places around the perimeter of the conduit. It is also advantageous to use fluorescent tubes because they generate relatively little heat.

A cooling means may be positioned such that it surrounds the conduit. This presents the additional advantage that when the apparatus is used for radiation-polymerizable fluids, the polymerization (which is temperature dependent) within the apparatus is inhibited, so that the risk of occlusion of the conduit is further reduced.

A particularly effective cooling means of the invention includes a cooling vessel through which a coolant flows and which coaxially surrounds the conduit. Preferably, the flow of coolant is opposite the flow of the irradiated fluid, which is particularly advantageous in that the most effective cooling takes place at the end of the conduit where the fluid has received the greatest radiation dose.

In one embodiment of the invention, the cooling vessel has an annular cross-section, and the reaction tube and the cooling system may be separated from one another, such that the conduit, including the mixer situated therein and possibly also polymerized fluid at the outlet, may be readily replaced.

In another embodiment of the invention, the conduit passes through a light-guiding block, which is mirrored on its outer surface and which constitutes part of the irradiation means. One end of a light-guiding rod which is coupled to a radiation source is positioned within a bore of the light-guiding block. This arrangement presents an apparatus which is especially compact and easy to manufacture, and which provides irradiation of the fluid which is very uniform on all sides. The mirroring of the light-guiding block provides the greatest possible utilization of available radiation. The bore coupling with the light-guiding rod allows for easy replacement of the light-guiding block.

A cold light source may be used as the radiation source, in which case the means for cooling the fluid becomes superfluous.

BRIEF DESCRIPTION OF THE DRAWINGS

FIG. 1 shows a side view, partially in section, of an irradiation apparatus according to a first embodiment;

FIG. 2 is an enlarged representation of detail of FIG. 1, illustrating the static mixer positioned in the conduit;

FIG. 3 is a side view of a portion of an irradiation apparatus according to another embodiment; and FIG. 4 is a section view taken along line IV—IV of FIG. 3.

DESCRIPTION OF THE PREFERRED EMBODIMENT

As shown in FIG. 1, the apparatus includes a housing 10, which carries a reaction tube 11 in its longitudinal direction. The tube 11 is carried at both ends by means of suitable bushings 12 and 13 in end plates 14 and 15 of the housing 10. In operation, the irradiated fluid flows from right to left through the tube 11, from the point of view of FIG. 1.

The tube 11 is surrounded along substantially its entire length by a cooling vessel 16 having an annular cross section. The cooling vessel 16 is coupled to a cooling unit (not shown) positioned above the housing 10, by means of an inlet pipe 17 and an outlet pipe 18, which is represented in dotted fashion. The cooling unit may be a compressor or a Peltier cooler. A coolant, such as a glycol-water mixture, is chilled within the cooling unit, thereby producing a convection current through the inlet pipe 17, the cooling vessel 16 surrounding the tube 11, the outlet pipe 18, and back to the cooling unit.

Two U-shaped fluorescent tubes 19 and 20 are positioned within the housing 10, and are situated above and below the tube 11 surrounded by the cooling vessel 16, such that the altogether four arms of the two fluorescent tubes 19 and 20 are spaced approximately evenly around the periphery of the tube 11. The lamp sockets are mounted on the right end plate 14 of the housing 10. In FIG. 1, the upper fluorescent tube 19 is diplaced somewhat towards the right, in order to provide room for the inlet pipe 17 of the cooling system.

A static mixer 21 is positioned within the tube 11, and extends along substantially the entire length of the tube 11. As shown in FIG. 2, the mixer 21 includes a plurality of vanes 22 which are positioned behind one another in an axial direction, and are connected to one another by means of short axial shafts 23. The vanes 22 are screw-shaped, with their twisting directions alternating in the axial direction of the tube 11. In each case the leading edge of a vane is at right angles to the trailing edge of the preceding vane. By this structure, the two fluid streams which flow from an upstream vane are divided into halves over and over again. The vanes 22 also deflect the oncoming fluid towards the wall of the tube. With this arrangement, an especially thorough mixing of the entire fluid flowing through the conduit is achieved, and all portions of the fluid are repeatedly brought near the tube wall, where the radiation from the fluorescent tubes 19 and 20 is the most intensive.

The wavelength of the radiation is chosen based upon the particular application and upon the composition of the fluid to be irradiated. For instance, if an adhesive is used which can be preactivated by means of visible radiation, then the fluorescent tubes 19 and 20 should produce visible light. In this case, both the tube 11 and the cooling vessel 16 should be made from glass or acrylic which is transparent to visible light. In addition, the glycol-water mixture which is used as a coolant is highly transparent to visible radiation.

Heat radiation over about 800 nm from the fluorescent tubes 19 and 20 is absorbed by the cooling jacket which surrounds the reaction tube 11.

In order to utilize the radiation emitted by the fluorescent tubes 19 and 20 as fully as possible, the inner wall of the preferably cylindrical housing 10 is provided with a coating 24 which reflects the useful range of radiation. In order to avoid unnecessary heating, the coating 24 and the casing of the housing 10 are transparent to heat radiation.

Despite the turbulent stream produced by the mixer 21 in the tube 11 and the cooling means which retards the reaction of the fluid within the tube 11, after a long period of use polymerized deposits will form on the inner wall of the conduit, which will gradually diminish the cross-sectional size of the flow. In addition, after a long period of nonuse, the outlet end of the tube 11 will become obstructed by polymerized fluid. In this case, the bushing 12 on the end plate 14 may be unscrewed, so that the tube 11 along with the mixer 21 may be pulled out towards the right end and replaced. In order to avoid contamination of the apparatus, it is important that the conduit be removed in this manner, so that only the outlet end, at which the adhesive has already set, is drawn through the interior of the apparatus.

In the apparatus which is partially represented in FIGS. 3 and 4, the reaction tube 11 and the static mixer 21 pass through a bore 31 formed within a light-guiding block 30. The block 30 is formed from polymethylmethacrylate and is mirrored on its entire outer surface. The radiation for the polymerization of the fluid flowing through the bore 31 is produced by a cold light source (not shown) and is conducted into a light-guiding rod 32, whose end is introduced into a pocket bore 33 provided in the block 30. The radiation which is thus conducted into the block 30 is conveyed by reflection and total internal reflection to all sides of the bore 31, resulting in a substantially homogeneous irradiation of the fluid.

Following an interruption in the irradiation procedure and setting of the fluid, the tube 11 and the mixer 21 can readily be removed from the bore 31 in the light-guiding block. Also, as shown in FIG. 3, the end of the light-guiding rod 32 is removably placed in the light-guiding block 30, to which a metering means (not shown) may also be removably fastened. Thus, the block 30 may, if necessary, easily be removed from the apparatus.

We claim:

1. An apparatus for irradiating a fluid, including:
   a conduit through which the fluid flows and made from a material which is transparent to the radiation being used;
   an irradiation means surrounding the conduit for irradiasting the fluid; and
   vanes positioned within the conduit for deflecting the fluid flow transversely with respect to an axis of the conduit.

2. The apparatus of claim 1, wherein said vanes are screw-shaped and form part of a static mixer, said screw-shaped vanes being positioned behind one another in the axial direction, each of which divides the oncoming fluid stream and diverts it outwardly from the axis.

3. The apparatus of claim 1, wherein said irradiation means comprises a plurality of fluorescent tubes positioned parallel to said conduit.

4. The apparatus of claim 1, further including a cooling means transparent to the radiation and surrounding said conduit.

5. The apparatus of claim 4, wherein said cooling means includes a cooling vessel through which a coolant flows and which coaxially surrounds said conduit.

6. The apparatus of claim 5, wherein the flow of coolant is opposite the flow of the irradiated fluid.

7. The apparatus of claim 5, wherein said cooling vessel has an annular cross-section and said conduit is removable from said cooling vessel.

8. The apparatus of claim 1, wherein said irradiation means includes a light-guiding block through which said conduit passes.

9. The apparatus of claim 8, wherein said light-guiding block has a mirrored outer surface.

10. The apparatus of claim 8, wherein:
    said light-guiding block includes a bore; and
    said irradiation means includes a light-guiding rod coupled to a radiation source and having an end inserted into said bore.

11. The apparatus of claim 10, wherein said radiation source is a cold light source.

* * * * *